Jan. 11, 1966        G. C. RUSSELL        3,228,158

PANEL RETENTION TYPE JOINT

Filed Oct. 25, 1962        2 Sheets-Sheet 1

INVENTOR.
GORDON C. RUSSELL
BY
George C. Sullivan
Agent

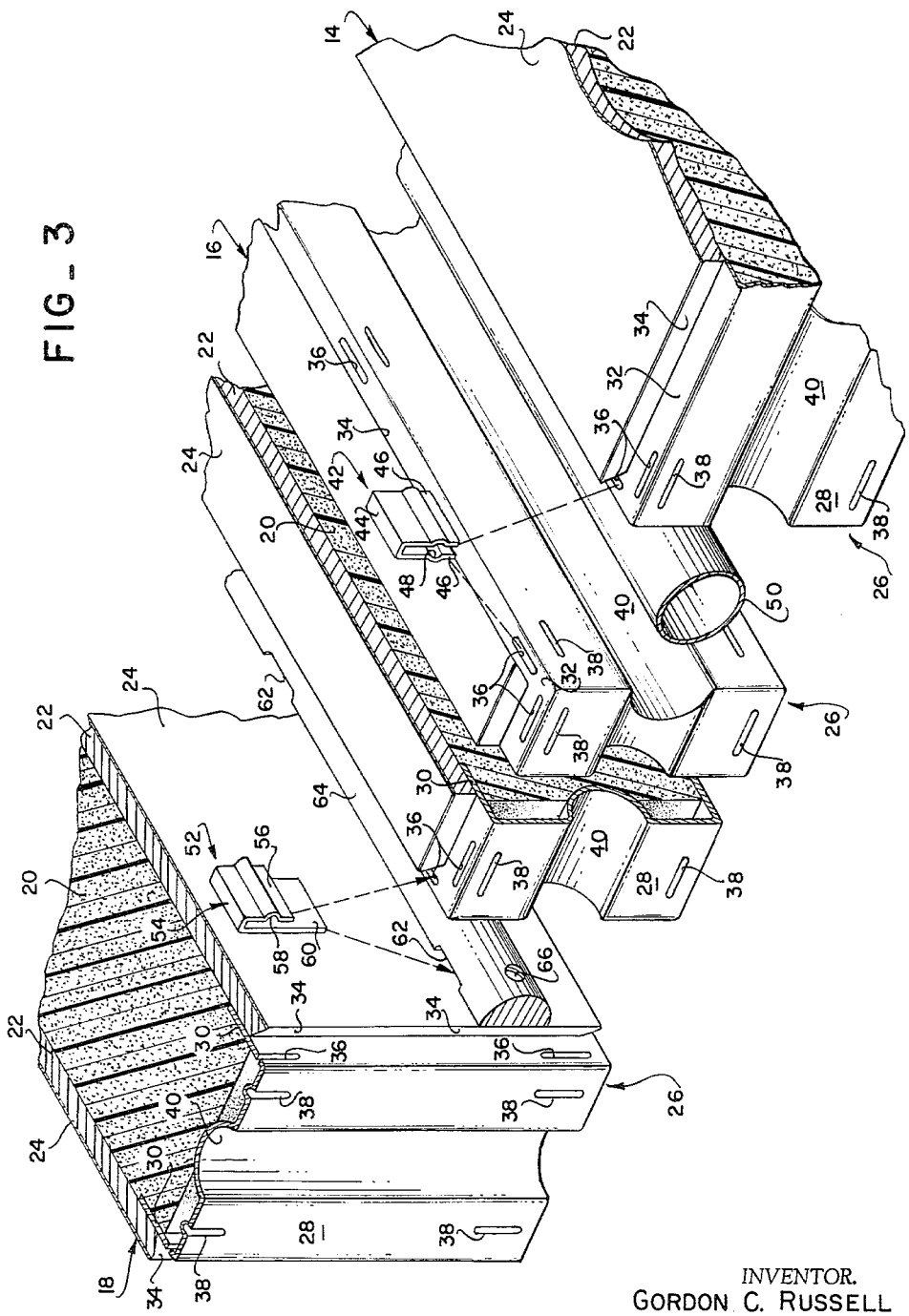

United States Patent Office 3,228,158
Patented Jan. 11, 1966

3,228,158
PANEL RETENTION TYPE JOINT
Gordon C. Russell, Studio City, Calif., assignor to Lockheed Aircraft Corporation, Burbank, Calif.
Filed Oct. 25, 1962, Ser. No. 232,968
2 Claims. (Cl. 52—580)

This invention relates to new and improved panel retention type joints for use in securing rigid panels to one another.

At the present time, a great deal of interest is being shown in the field of constructing "demountable" buildings such as homes, apartments, storage structures, and the like from rigid type building panels. Such panels may consist of a cellular core of a plastic composition laminated between wood sheets which are surmounted by a weather-resistant plastic film. In the construction of buildings of demountable character from such panels a major field of concern is the construction of the joints which are used to secure those panels serving a load carrying function to one another.

To be satisfactory for this purpose, a joint must utilize relatively inexpensive components. In addition, such a joint to be acceptable must be of a comparatively simple character so that it may be easily assembled, and preferably it should also be of such a character that it can be disassembled with equal facility. It is normally also desired that such a joint be of a type requiring no special tools to either assemble or disassemble it.

An object of the present invention is to provide new and improved panel retention joints for use with rigid panels such as panels of the general category indicated in the preceding. It is to be understood however, that the panel retention joints of this invention can be employed with other different types of panels. Other objects of the present invention are to provide panel retention type joints which are relatively inexpensive, which are capable of being easily and conveniently assembled or disassembled by comparatively unskilled labor and which can be used for building or other purposes. Thus, the panel retention type joints of the present invention can be employed in construction crates, boxes or the like which are capable of being easily assembled or disassembled.

Further objects of this invention as well as many specific advantages of it will be apparent from a detailed consideration of the remainder of this specification, the appended claims and the accompanying drawings in which:

FIGURE 3 is an exploded isometric view showing certain details of the joints illustrated in the preceding figures.

Figures 1, 2:
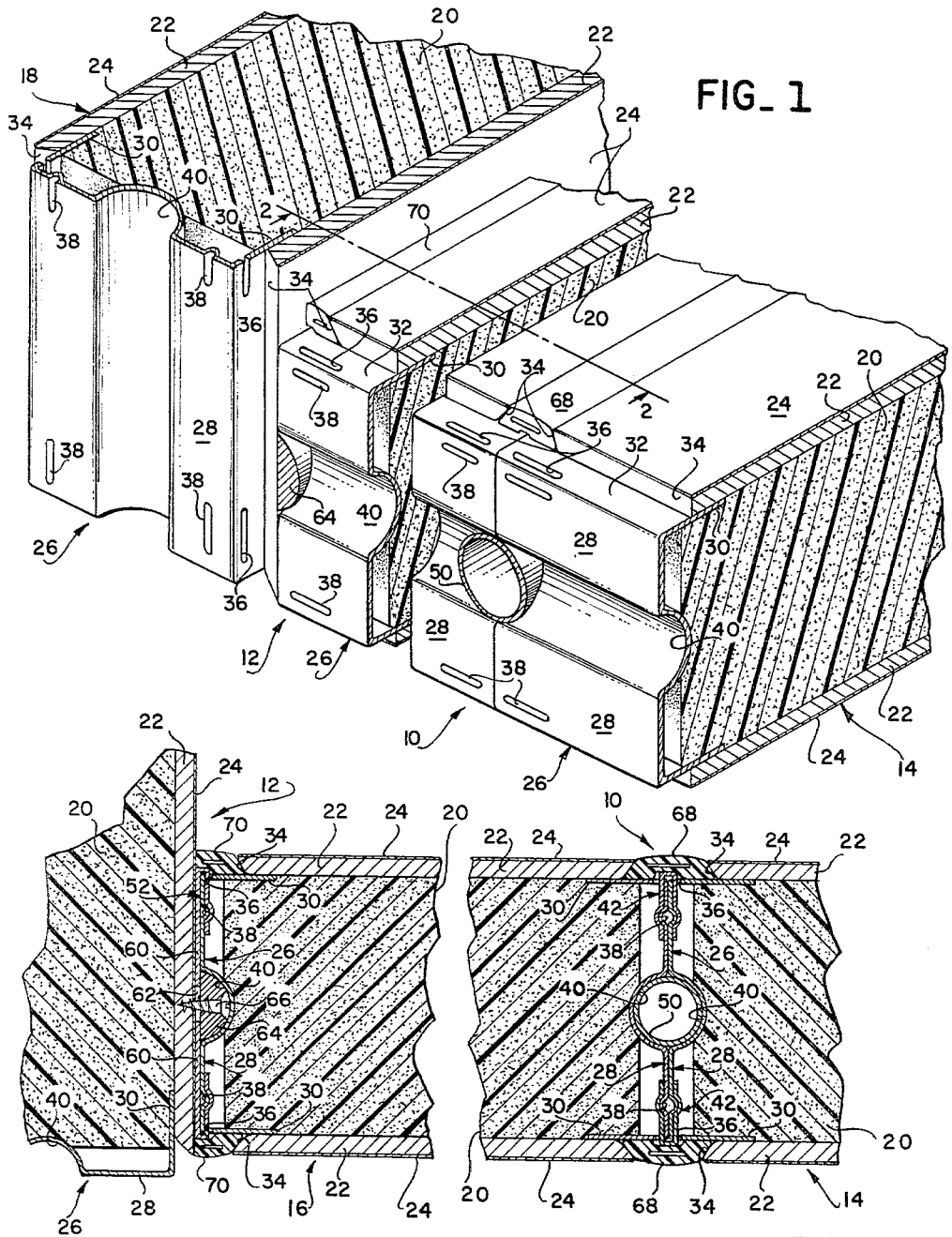
FIGURE 1 is an isometric view, showing two different panel retention type joints of the present invention, parts of the panels in this view being broken away.
FIGURE 2 is a cross-sectional view at line 2—2 of FIGURE 1.

The accompanying drawings are primarily intended so as to aid or facilitate in an understanding of the present invention. From a careful consideration of this specification those skilled in the application of engineering principles in the construction field will realize that a number of different minor changes of a routine engineering character may be made in the precise joints illustrated without departing from the features or principles of this invention set forth in the appended claims.

As an aid to understanding this invention it can be stated in essentially summary form that it relates to panel retention type joints, each of which utilizes in combination at least one rigid panel having a channel located at at least one of its edges, this channel including an outwardly directed groove, a member located against the channel, a support held by a member and fitting closely within the groove in the channel and a plurality of holding means connecting the channel and the member. With this type of construction the holding means are primarily designed for temporary securing purposes, and are not intended to transmit any significant loads between the panel and the member. In a joint of the present invention such loads are transmitted through the support employed.

The actual details of this invention will be more fully apparent from a detailed consideration of the accompanying drawings. Here there are shown joints 10 and 12 of this invention which are used in connecting horizontally extending panels 14 and 16 and a vertically extending panel 18. All three of these panels 14 and 16 and 18 are constructed in an identical manner so as to have a flat core 20 which is laminated between sides 22. The cores 20 may be composed of a wide variety of different materials such as a rigid cellular impregnated paper or metal type structure, a cellular polystyrene or polyurethane composition or the like. Preferably the sides 22 are of structurally strong, sufficiently rigid composition to protect the cores 20 from physical damage. These sides 22 may be composed of common plywood or other equivalents; if desired these sides 22 can be surmounted by an attached protective film 24 such as a film of a phenolic or similar material.

In accordance with this invention the edges of the panels 14, 16 and 18 carry identically formed rigid, preferably metal channels 26. Each of these channels 26 is of essentially a U-shape and includes a base 28 and attached parallel sides 30. These channels 26 are preferably secured to the panels 14, 16 and 18 during the manufacture of these panels so that the outer surfaces of the sides 30 are directly connected to the surfaces of the sides 22 facing the cores 20 in these panels. Such attachment may be accomplished through the use of a conventional adhesive (not shown) or through the use of metallic fasteners or the like. Preferably, these channels 26 are positioned so that each of the sides 30 includes a relatively small surface area 32 projecting beyond the edge 34 of the side 22 to which it is attached. It is also preferred to bevel these edges 34 inwardly as indicated in FIGURES 2 and 3 of the drawing for a purpose as hereinafter explained.

Within each of the areas 32 on each of the sides 30 there are located a plurality of equally dimensioned, spaced slots 36. These slots 36 are all located adjacent to the base 28 of the channel 26 in which they are formed. Preferably, the bases 28 of these channels includes ridges 38 located parallel to and adjacent to each of the slots 36. These ridges 38 are also preferably spaced equidistant from the slots 36, and are formed so as to be directed inwardly towards the interior of a panel. Each of the bases 28 also includes an elongated groove 40 extending symmetrically with respect to the base on which it is formed so as to face outwardly, away from the panel upon which it is located. The grooves 40 are all of a smooth wall, uniform cross-sectional configuration; preferably each of these grooves 40 is shaped as one-half or one side of an elongated cylinder.

When a joint such as the joint 10 is to be created, the panels 14 and 16 are located next to one another as indicated in FIGURES 1 and 2 of the drawings so that the base 28 of the channel 26 on one of the panels is located in alignment with and against the corresponding base of the channel on the other of the panels. As the two panels 14 and 16 are held in this position, small resilient clips 42 may be inserted as far as possible within adjacent pairs of the slots 36. Preferably these clips 42 are used along both of the sides 30 of the channels 26. These clips 42 are each of a U-shape, and each includes a base 44 and attached sides 46. Preferably these sides 46 are formed so as to include internal grooves 48 which open towards one another. The clips 42 are dimensioned so that the widths of the interiors of their bases 44 correspond to the distance between two of the slots 36 when panels such as the panels 14 and 16 are held against one another. They are also dimensioned so that the grooves 48 overlie and engage the ridges 38 when the clips 42 are inserted through the slots 36.

When the clips 42 are used in this manner they serve as "connecting means" so as to connect and hold the panels 14 and 16 with respect to one another. From a consideration of their construction and the manner in which they are used, it will be apparent that they do not effectively "lock" these panels together so that the panels 14 and 16 may be subjected to significant loads in the joint 10. Such a "locking" against loads is achieved through the use of a rigid support 50. This support 50 may be inserted in the grooves 40 after the clips 42 have been placed in position.

In the joint 10 the support 50 is a common cylindrical tube such as may be conveniently manufactured at a nominal cost by known extrusion or other known techniques. The support 50 is preferably of a rigid material such as a metal, and is substantially incapable of deforming under the loads to be placed upon the panels 14 and 16. In the joint 10 this support 50 fits closely against the interiors of the grooves 40 within which it is located. This support 50 when formed of a rigid material so as to fit in this manner effectively transmits any load applied to either of the panels 14 or 16 to the other of these panels, and prevents relative motion between the two panels such as would cause any of the clips 42 to become released from its operative position.

From a careful consideration of the above it will be realized that if desired a support 50 may be located between the panels 14 and 16 prior to the clips 42 being attached to these panels, and that the clips 42 primarily serve to prevent the adjacent ends of the complete panels 14 and 16 from being moved away from one another.

In the joint 12 other similarly constructed clips 52 are employed. Each of these clips 52 has a base 54 carrying a side 56 having a groove 58 formed in it which corresponds to the groove 48 previously described. Each of the clips 52 also has another flat side 60 which is adapted to fit within a notch 62 in a support 64 having the shape of one-half or a side of a cylinder. The notches 62 in the support 64 are located the same distance apart as the slots 36 in the channels 26 so as to permit the clips 52 to be employed.

In forming a joint 12 a support 64 may be mounted upon the side 22 of a vertically extending panel 16 as shown in the drawings through the use of screws 66 or other conventional fasteners. This support 64 may then be brought into engagement with the groove 40 in the base 28 of the channel 26 of the panel 16. At this point a plurality of the clips 52 are preferably inserted through the slots 36 and the notches 62 in order to effectively hold the panels 16 and 18 with respect to one another. Because of the fact that the notches 62 are positioned generally between the support 64 and the panel 18 in the joint 12 they may be referred to as being located upon the panel 18 and may be referred to as "slots."

From a consideration of the aforegoing with respect to the joint 12 it will be realized that preferably the support 64 is dimensioned as to fit closely within a groove 40 in order to achieve the type of action achieved by the support 50 in the joint 10. It will also be realized that in their joints preferably the supports 50 and 64 extend the entire length of the adjacent edges of the panels upon which they are used, but that they need not extend this entire distance if only comparatively light loads are to be encountered.

The joints 10 and 12 described in the preceding may, if desired, be "finished off" by the use of elongated strips 68 and 70, respectively. Preferably these strips 68 and 70 are of a uniform cross-sectional configuration; they may be both formed out of a somewhat resilient material such as polychloroprene or the like. The strip 68 used with the joint 10 preferably has a shape of an isosceles trapezoid so as to fit under the edges 34 on the panels 12 and 14 when these panels are assembled together. The strip 70 used with the joint 12 preferably has the shape of a right angle trapezoid so as to fit under the edges 34 of the panel 16 and against the panel 18. The beveled shape of the edges 34 effectively prevent these strips 68 and 70 from being accidentally dislodged. Preferably these strips 68 and 70 are formed so as to be slightly larger than the spaces within which they are to be used so that they will also be held in place by frictional contact.

From a careful consideration of the preceding parts of this specification it will be realized that the various parts of the joints 10 and 12 may be easily and conveniently manufactured with a minimum of difficulty. It will also be realized that these joints may be assembled or created without difficulty by even comparatively unskilled labor not having tools at its disposal. Joints such as the joints 10 and 12 may be disassembled with a minimum of difficulty by merely removing the strips 68 and 70 and prying the clips 42 and 52 from their locations.

Because of the nature of this invention, and the fact that various minor changes falling within the scope of routine engineering skill may be made in the joints herein described, the invention itself is to be considered as being limited solely by the appended claims forming a part of this disclosure.

What is claimed is:

1. A joint construction which includes;
   (a) a generally U-shaped, rigid channel having a base and ends extending from opposite edges of said base, said channel having a groove formed in said base;
   (b) a member fitting against said base of said channel;
   (c) a support attached to said member, said support fitting closely within the interior of said groove in said base;
   (d) a plurality of generally U-shaped clips, each of said clips having a first leg extending through a channel end, engaging said base and a second leg extending beyond said first leg and penetrating said support adjacent said member and connecting said support and channel to said member; and
   (e) a panel connected to the ends of said channel.

2. A panel and joint assembly comprising:
   a plurality of panels being arranged in the same plane and having parallel sides being spaced from one another to for a gap therebetween;
   a plurality of generally U-shaped rigid channels each having a base with a pair of parallel spaced apart sides extending in the same direction from the base, the channels being disposed within the gap between adjacent panels and arranged with the bases in abutting relation with the channel sides extending in opposite directions, respective sides of each channel being secured to the internal end surfaces of the sides of said panel; each channel having an elongated centrally-located semi-circular groove extending in the same longitudinal direction as the channel such that an elongated circular opening is formed between abutting bases on the channels;

a cylindrical support extending within and mating with the circular opening between abutting channels;

the channels including a pair of elongated spaced ridges being disposed on the channel bases one each on opposite sides of the channel groove and extending parallel to the channel sides, each channel including a plurality of spaced slots through the channel sides adjacent to the channel base and to the channel ridges with said slots in each channel being directly opposite one another;

a plurality of resilient U-shaped clips having a base and a pair of parallel flat sides extending in the same direction from the base, an elongated groove in each side of each clip extending parallel to the clip base and opening towards each other, the clip being inserted into abutting channels with one clip side extending respectively into opposed channel slots, whereby the clip sides mate with the channel base and the channel ridges.

References Cited by the Examiner
UNITED STATES PATENTS

| | | | |
|---|---|---|---|
| 958,557 | 5/1910 | Stiggleman | 189—35 X |
| 2,010,848 | 8/1935 | Dix | 52—481 |
| 2,059,483 | 11/1936 | Parsons | 52—489 |
| 2,249,203 | 7/1941 | Guignon | 52—272 |
| 2,257,001 | 9/1941 | Davis | 52—601 |
| 3,033,332 | 5/1962 | Geibel | 189—35 |
| 3,040,393 | 6/1962 | Dailey | 20—69 |
| 3,059,292 | 10/1962 | Harris | 20—69 |
| 3,082,849 | 3/1963 | Keller | 52—204 |
| 3,087,586 | 4/1963 | Gray | 52—241 |
| 3,102,612 | 9/1963 | Dunnington | 52—464 |
| 3,102,614 | 9/1963 | Lydard | 189—35 |

RICHARD W. COOKE, Jr., *Primary Examiner.*

JACOB L. NACKENOFF, FRANK L. ABBOTT,
*Examiners.*

L. R. RADANOVIC, K. E. PAYNE, *Assistant Examiners.*